United States Patent
Lee

(10) Patent No.: US 10,122,852 B2
(45) Date of Patent: Nov. 6, 2018

(54) SYSTEMS AND METHODS FOR AN INTEGRATED INTERACTIVE RESPONSE SYSTEM AND MOBILE DEVICE

(71) Applicant: JPMorgan Chase Bank, N.A., New York, NY (US)

(72) Inventor: Sih Lee, Northvale, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 21 days.

(21) Appl. No.: 14/086,280

(22) Filed: Nov. 21, 2013

(65) Prior Publication Data

US 2015/0094036 A1 Apr. 2, 2015

Related U.S. Application Data

(60) Provisional application No. 61/885,272, filed on Oct. 1, 2013.

(51) Int. Cl.
*H04M 3/493* (2006.01)
*H04W 4/16* (2009.01)
(Continued)

(52) U.S. Cl.
CPC ............ *H04M 3/493* (2013.01); *H04W 4/16* (2013.01); *H04M 1/72519* (2013.01); *H04M 2207/18* (2013.01); *H04W 4/04* (2013.01)

(58) Field of Classification Search
CPC ............ H04M 3/493; H04M 2207/18; H04M 2203/254; H04M 2215/2026;
(Continued)

(56) References Cited

U.S. PATENT DOCUMENTS 6,885,737 B1 4/2005 Gao et al.
7,027,990 B2 4/2006 Sussman
(Continued)

FOREIGN PATENT DOCUMENTS

DE 19927010 A1 * 12/2000 ............ H04M 3/487

OTHER PUBLICATIONS

DE 19927010 A1 (WO2000076225A1)—Machine Translation. Generated Mar. 10, 2017.*
(Continued)

*Primary Examiner* — Kathy Wang-Hurst
*Assistant Examiner* — Ernest Tacsik
(74) *Attorney, Agent, or Firm* — Hunton Andrews Kurth LLP

(57) ABSTRACT

System and method for integrated interactive response system and mobile devices are disclosed. According to one embodiment, a method for using an interactive response system with a mobile device may include (1) an application executed on a mobile electronic device initiating contact with an interactive response system for a first provider; (2) the application retrieving a plurality of menus for the interactive response system; (3) the application displaying a first menu comprising a first plurality of options for the interactive response system; (4) receiving a first selected option from one of the first plurality of options; and (5) the application providing the interactive response system with the first selected option.

16 Claims, 5 Drawing Sheets

(51) Int. Cl.
*H04W 4/04* (2009.01)
*H04M 1/725* (2006.01)

(58) Field of Classification Search
CPC .......... H04N 5/44543; H04N 21/4532; H04N 21/44222; H04N 21/4622
See application file for complete search history.

(56) References Cited

U.S. PATENT DOCUMENTS

| | | | |
|---|---|---|---|
| 8,155,280 B1* | 4/2012 | Or-Bach | H04M 3/493 379/88.13 |
| 8,223,931 B1* | 7/2012 | Lavian et al. | 379/88.13 |
| 2005/0086699 A1* | 4/2005 | Hahn et al. | 725/106 |
| 2007/0135101 A1 | 6/2007 | Ramati et al. | |
| 2008/0043956 A1* | 2/2008 | Wu | 379/201.01 |
| 2009/0054031 A1* | 2/2009 | Smith et al. | 455/406 |
| 2009/0097628 A1* | 4/2009 | Yap | H04M 3/50 379/202.01 |
| 2009/0149158 A1 | 6/2009 | Goldfarb et al. | |
| 2009/0253420 A1* | 10/2009 | Stewart | H04M 15/00 455/417 |
| 2010/0210245 A1* | 8/2010 | Kim | H04M 3/42382 455/412.1 |
| 2010/0332389 A1* | 12/2010 | Al-Sahli | 705/43 |
| 2012/0008755 A1* | 1/2012 | Mittal | 379/93.01 |
| 2012/0063574 A1 | 3/2012 | Or-Bach | |
| 2012/0237009 A1* | 9/2012 | Szpilfogel | H04M 3/42382 379/88.13 |
| 2013/0094633 A1 | 4/2013 | Mauro | |
| 2013/0219471 A1* | 8/2013 | Brown | H04W 12/08 726/4 |
| 2014/0066016 A1* | 3/2014 | Rodriguez | H04M 17/30 455/411 |

OTHER PUBLICATIONS

Notification of Transmittal of the International Search Report and the Written Opinion of the International Searching Authority, or the Declaration, dated Dec. 24, 2015.
International Search Report, dated Dec. 24, 2014.
Written Opinion of the International Searching Authority, dated Dec. 24, 2014.
European Patent Office Communication Pursuant to Rule 164(1) EPC, European Patent Application No. 14851223.9, dated Jul. 4, 2017, pp. 1-15.
European Patent Office Communication (Extended European Search Report), European Patent Application No. 14851223.9, dated Oct. 10, 2017, pp. 1-16.

* cited by examiner

SYSTEMS AND METHODS FOR AN INTEGRATED INTERACTIVE RESPONSE SYSTEM AND MOBILE DEVICE

RELATED APPLICATIONS

This application claims priority to U.S. Provisional Patent Application Ser. No. 61/885,272 filed Oct. 1, 2013, the disclosure of which is incorporated, by reference, in its entirety.

BACKGROUND OF THE INVENTION

1. Field of the Invention

The present invention generally relates to the use of interactive voice response systems, and, more particularly, to systems and methods for integrated interactive voice response system and mobile device.

2. Description of the Related Art

Interactive Voice Response (IVR) is a system that allows a computer to interact with a human through the use of voice and dual-tone multi-frequency (DTMF) tones through the phone's keypad. While technological advancements in areas such as speech recognition, network efficiency, and computer processing in general have contributed to overall value proposition of IVR, there still are few shortcomings. For example, IVR systems are criticized as being unhelpful and difficult to use due to inherent design constraints. Furthermore, IVR systems are perceived as companies trying to reduce operational cost by not staffing the agents to help customers. Such challenges detract from original benefits, and furthermore create frustrations to some customers who simply want to speak to someone.

SUMMARY OF THE INVENTION

Systems and methods for integrated interactive response systems and mobile devices are disclosed. According to one embodiment, a method for using an interactive response system with a mobile device may include (1) an application executed on a mobile electronic device initiating contact with an interactive response system for a first provider; (2) the application retrieving a plurality of menus for the interactive response system; (3) the application displaying a first menu comprising a first plurality of options for the interactive response system; (4) receiving a first selected option from one of the first plurality of options; and (5) the application providing the interactive response system with the first selected option.

In one embodiment, the method may further include: (6) the application displaying a second menu corresponding to the first selected option, the second menu comprising a second plurality of options for the interactive response system; (7) receiving a second selected option from one of the second plurality of options; and (8) the application providing the interactive response system with the second selected option.

In one embodiment, the mobile electronic device may communicate with the interactive response system using a single communication channel.

In another embodiment, the mobile electronic device may communicate with the interactive response system using a plurality of communication channels.

In another embodiment, the application may retrieve the plurality of menus for the interactive response system from local memory for the mobile electronic device.

In another embodiment, the application may retrieve the plurality of menus for the interactive response system from a network location.

In one embodiment, the method may further include receiving, from the interactive voice response system, at least one synchronization signal to synchronize the menu from the plurality of menus that is displayed.

In one embodiment, the application may provide the interactive response system with the first selected option as a DTMF signal.

According to another embodiment, a method for using an interactive response system with a mobile device may include (1) an application executed on a mobile electronic device displaying a first menu comprising a first plurality of options for an interactive response system; (2) receiving a first selected option from one of the first plurality of options; (3) the application displaying a second menu corresponding to the first selected option, the second menu comprising a second plurality of options for the interactive response system; (4) receiving a second selected option from one of the second plurality of options; (5) the application initiating contact with the interactive response system; and (6) the application providing the interactive response system with the first selected option and the second selected option.

In one embodiment, the application may provide the interactive response system with the first selected option and the second selected option as DTMF signals.

In another embodiment, the application may provide the interactive response system with the first selected option and the second selected option in at least one data packet.

In another embodiment, the application may retrieve the plurality of menus for the interactive response system from local memory for the mobile electronic device.

In another embodiment, the application may retrieve the plurality of menus for the interactive response system from a network location.

According to another embodiment, a method for using an interactive response system with a mobile device may include (1) receiving, at an interactive response system, a first communication from a first device; (2) receiving, at the interactive response system, a request to communicate with a second device; (3) providing, over a network, a link to a software application to be used with the interactive response system; and (4) receiving, at the interactive response system, a second communication from the second device using the software application.

In one embodiment, the first device may be a telephone.

In another embodiment, the first communication may be received over a first communication network, and the second communication may be received over a second communication network.

In one embodiment, the first communication may be received over a plain old telephone service network.

In one embodiment, the second communication may include a DTMF signal.

In another embodiment, the second communication may include a data packet.

In one embodiment, the method may further include authenticating the second device.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
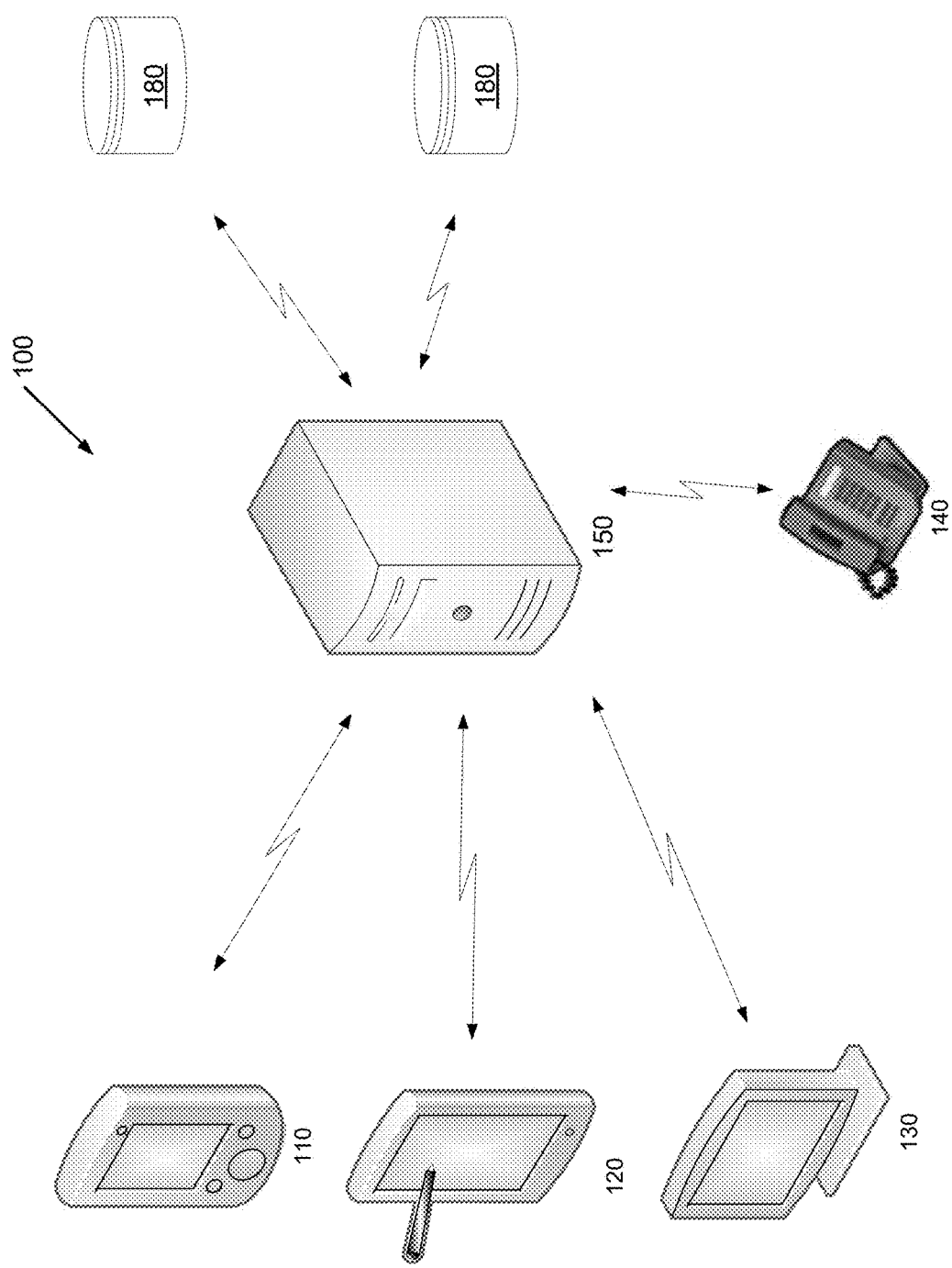
FIG. 1 is a block diagram of a system for integrated interactive voice response system and mobile device according to one embodiment.

Several embodiments of the present invention and their advantages may be understood by referring to FIGS. 1-5 wherein like reference numerals refer to like elements.

The present disclosure is related to U.S. Provisional Patent Application Ser. No. 60/244,914, filed Nov. 2, 2000; U.S. Pat. No. 7,103,556, filed Sep. 26, 2001; U.S. patent application Ser. No. 11/281,438, filed Nov. 18, 2005; and U.S. patent application Ser. No. 13/644,326, filed Oct. 4, 2012. The disclosure of each is hereby incorporated by reference in its entirety.

Although this disclosure is in the context of an interactive voice response system, it should be noted that any automated, interactive response system may be used, including text-based systems, image-based systems, etc.

Embodiments relate to systems and methods for integrated interactive voice response system and mobile device. For example, a mobile application or software program may be provided that communicates with an interactive response system. The application may be provided by a good or service provider that hosts an interactive response system, such as a bank, utility provider, etc. and, from the user's perspective, may integrated with the interactive response system seamlessly. For example, the application may store the current interactive response system menu and may display the interactive response system options in place of the typical keyboard display.

In another embodiment, a user may call an interactive response system using a mobile device, and the interactive may recognize that the user is calling from a mobile device. Alternatively, the interactive response system may ask the user if he or she would like to have a link to an interactive response system companion program sent to his or her mobile device, computer, etc. and may request an address (e.g., phone number, email address, etc.). The interactive response system may send a link to the address, and the user may download, install, etc. the interactive response system companion program. Similarly, if a user is accessing the interactive response system using a landline, the user may request that a link to the interactive response system companion application be sent to an address for a mobile device, computer, etc. In one embodiment, once the interactive response system companion program is installed, the call may be transferred to the mobile device, computer, etc. as is necessary and/or desired.

Embodiments relate to the integration of a user's mobile device (e.g., smart phone, tablet computer, etc.) with the interactive response system to provide a more efficient way to navigate an interactive response system menu. For example, when a user calls an interactive response system number from his mobile device, an application may recognize the phone number and displays the call tree options (e.g., for English, press "1"; for Spanish, press "2") without the user having to listen to the options. As the user navigates the call tree, the options are updated to reflect the current tree level.

The user may also bypass certain levels of the call tree and instead jump directly to the desired option by pressing a "shortcut" menu pre-configured on the mobile app. For example, a user can press "Make a credit card payment," which will take the user directly to the call queue for the requested service or inquiry.

In another embodiment, the user may authenticate himself to a mobile application, and have access to sensitive information through an interactive response system. This eliminates having to speak the user's secure information and potentially even voice phishing. In addition, sensitive information may be displayed on the user's mobile device. For example, when the user speaks "balance", the value is returned and displayed on the mobile device and not spoken from the interactive response system.

The menu options displayed on the mobile may be linkable. That is, the user can press the menu directly, and does not have to go back to the "keypad" to press the associated numbers.

The user may be able to pre-select options before actually making the call to the interactive response system. The mobile application may be updated with the most current interactive response system call tree options for selected businesses, services, etc. In addition, the user may save popular menu options as shortcuts, so the user may be able to select a destination option by pressing one button.

The mobile application may include a "talk to an agent" button to connect the user directly at any point of the tree.

The mobile application may combine contextual information to deliver better experience. For example, if a user's service inquiry is best fulfilled in a branch, the mobile application will display and suggest the nearest branch, along with its directions, hours, etc. The mobile application may further provide the context of the call to a representative at that branch location so that the information is at the branch before the user arrives.

The user may associate additional devices with the calling number. For example, the user may associate a tablet computer with a landline phone number, and when the user calls an interactive response system using the landline, the user's tablet computer may be sent a message to assist in navigating the call tree.

Referring to FIG. 1, a system for integrated interactive voice response system and mobile device is disclosed. In one embodiment, system 100 may include smartphone 110, computer 120, terminal 130, landline phone 140, server 150, and database 180.

System 100 may include server 150. In one embodiment, server 150 may host an interactive voice response system that may communicate with a user through voice commands.

Database 180 may receive, store and/or maintain user information, account information, user preferences, interactive response system data (e.g., interactive response system menu data, etc.). Database 180 may store any other information as is necessary and/or desired.

In one embodiment, smartphone 110, computer 120, terminal 130, and/or landline phone 140 may store interactive response system data locally as necessary and/or desired. In one embodiment, smartphone 110, computer 120, terminal 130, and/or landline phone 140 may host an application, computer program, script, etc. that may store interactive response system data and may control communication with server 150.

In one embodiment, smartphone 110, computer 120, terminal 130, and/or landline phone 140 may communicate with server 150 over any suitable network. Suitable networks include, for example, the Internet, a local area network, a wide area network, a virtual private network, cellular, etc. In one embodiment, landline phone 140 may communicate with server 150 using a plain old telephone service (POTS) network. In another embodiment, landline phone 140 may communicate with server 150 using voice over internet protocol (VoIP). Other communication networks, including near field communication (NFC), Bluetooth, etc. may be used as necessary and/or desired.

Figure 2:
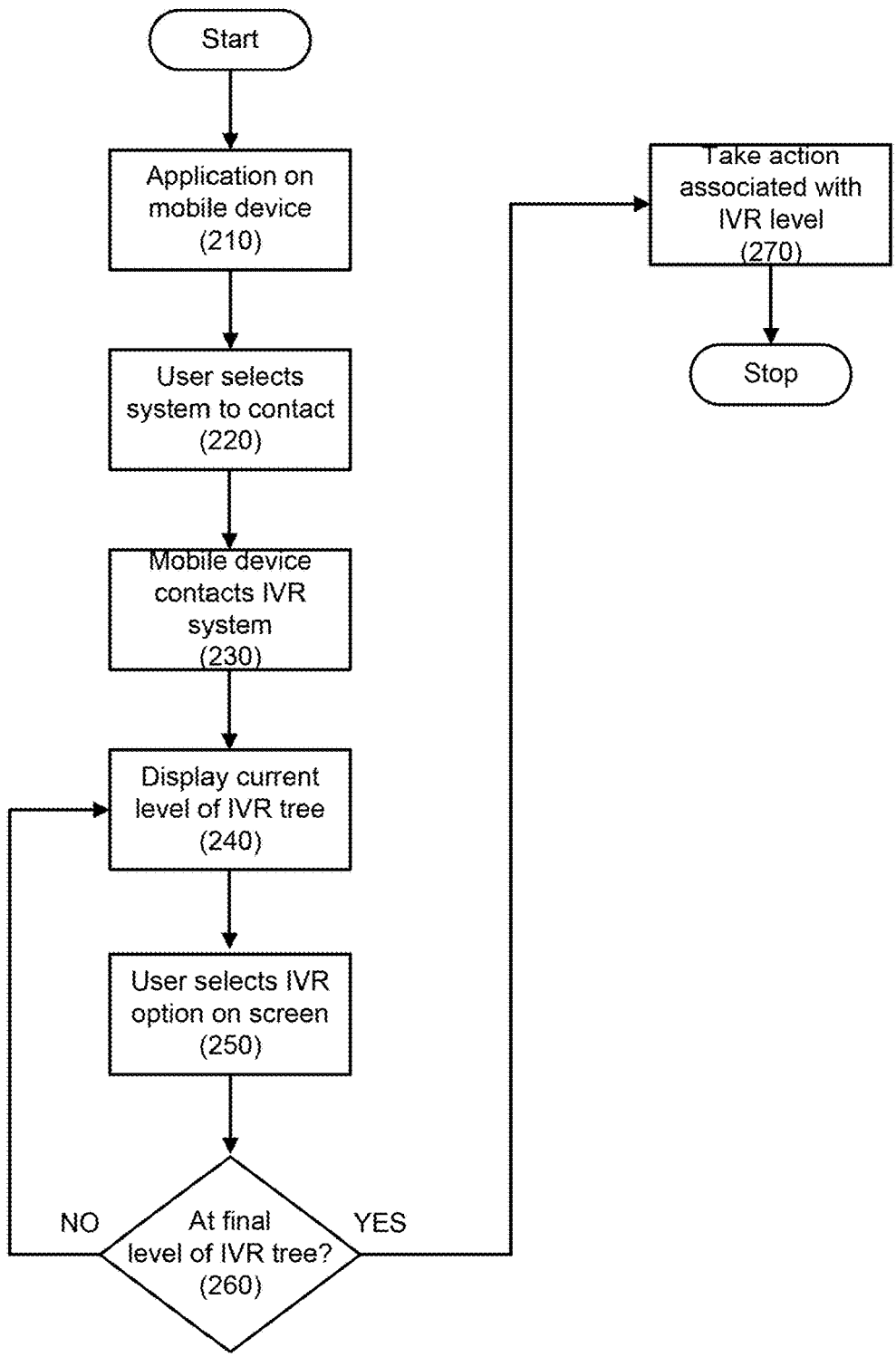
FIG. 2 depicts a method for using an integrated interactive voice response system and mobile device according to one embodiment.

Referring to FIG. 2, a method for integrated interactive voice response system and mobile device according to one embodiment is provided.

In step 210, a mobile device or other electronic device may execute an application or computer program. In one embodiment, the application may interact with the device's phone application or other communication application.

In one embodiment, the application may be a company-specific application. In another embodiment, the application may be a website provided by a specific company. In still another embodiment, the application may be a website that may interact with more than one interactive response system.

In step 220, the user may select an interactive response system to contact. In one embodiment, this may be done by the user selecting the interactive response system through a drop-down menu, entering a name, etc. In one embodiment, the user may select an interactive response system by dialing a telephone number, and the application may identify the interactive response system based on the numbers entered. In another embodiment, the interactive response system may be associated with the application that is being executed.

In step 230, the application may contact the interactive response system. In one embodiment, the application may contact the interactive response system over the Internet. In another embodiment, the application may contact the interactive response system using a cellular network. In still another embodiment, the application may contact the interactive response system using a POTS.

In step 240, the application may display the current level of the interactive response system tree to the user. In one embodiment, instead of a keypad, the option may be identified. For example, at a first level, rather than numbers "1" and "2", the options "English" and "Spanish" may be displayed.

In one embodiment, the interactive response system may periodically send a synchronization signal that may keep the mobile application and the interactive response system synchronized. For example, the signal may inform the mobile application of the interactive response system menu level that it is on. In one embodiment, if the mobile application and the interactive response system are not synchronized, one or both may take a corrective action. The signal may be communicated using any suitable network.

In step 250, the user may select an option from the screen, and the mobile device may send the associated signal to the interactive response system. For example, the mobile application may generate the DTMF signal associated with the selected option. In another embodiment, the application may provide a signal that may be accepted and processed by the interactive response system. In another embodiment, the application may provide a data packet to the interactive response system.

In step 260, if the final level of the tree has not been reached, the next level of the tree is displayed.

If the final level of the tree has been reached, in step 270, the action associated with the selected option may be taken.

Figure 3:
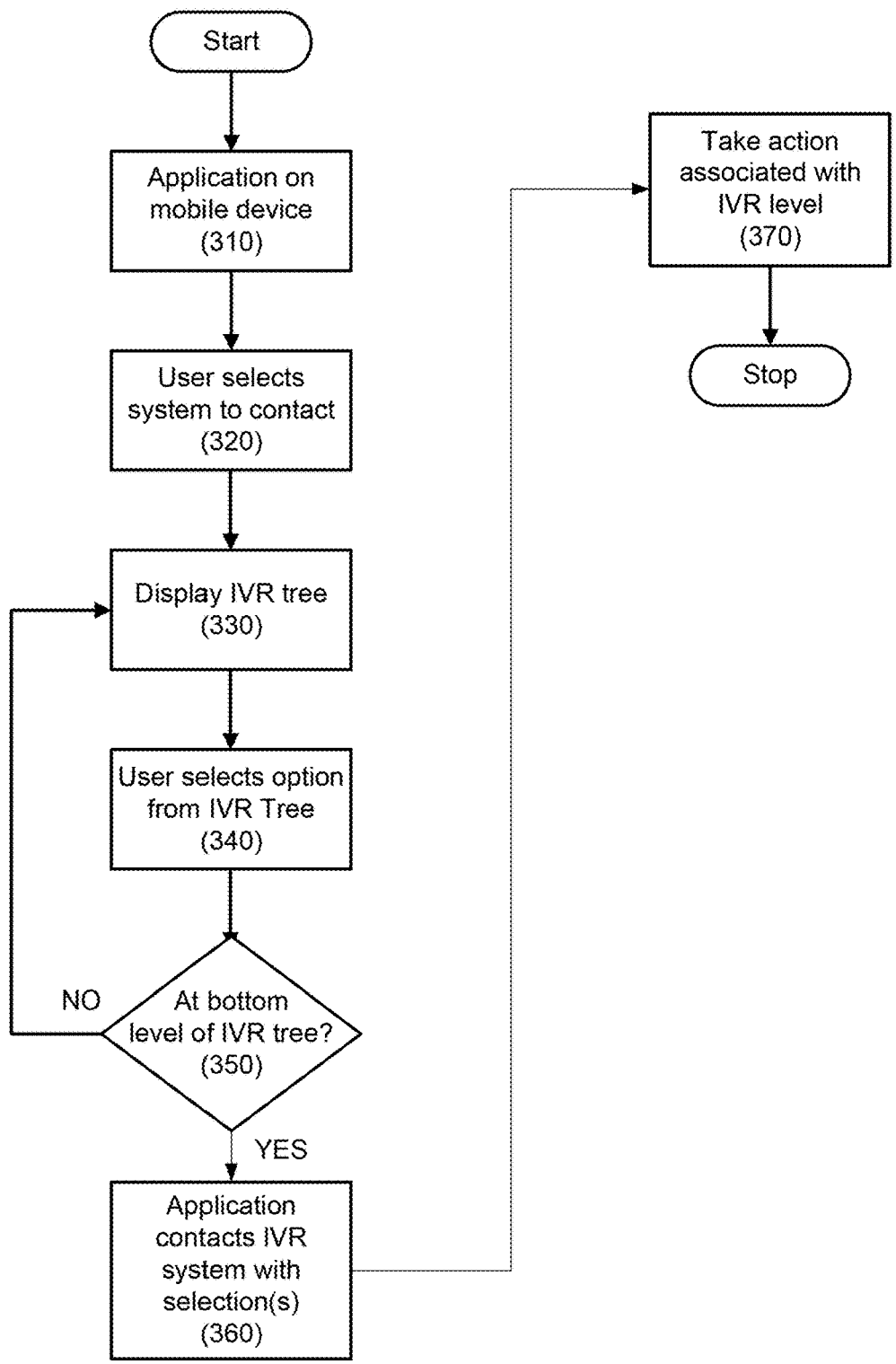
FIG. 3 depicts a method for integrated interactive voice response system and mobile device according to one embodiment.

Referring to FIG. 3, method for using an integrated interactive response system and mobile device according to one embodiment is provided.

In step 310, a mobile device or other electronic device may execute an application or computer program. In one embodiment, the application may interact with the device's phone application or other communication application.

In one embodiment, the application may be a company-specific application. In another embodiment, the application may be a website provided by a specific company. In still another embodiment, the application may be a website that may interact with more than one interactive response system.

In step 320, the user may select an interactive response system to contact. In one embodiment, this may be done by the user selecting the interactive response system through a drop-down menu, entering a name, etc. In one embodiment, the user may select an interactive response system by entering, but not dialing, a telephone number, and the application may identify the interactive response system based on the numbers entered. In another embodiment, the interactive response system may be associated with the application that is being executed.

In step 330, the application may display the interactive response system tree to the user. In one embodiment, the entire interactive response system tree (i.e., all levels) may be displayed for the user. In another embodiment, the interactive response system tree may be displayed by level. The user may zoom in/out, scroll left/right or up/down as is necessary and/or desired.

In step 340, the user may select an option.

In step 350, if the selected option is not at a bottom level of the interactive response system tree, then the user may be presented with the next level. In another embodiment, the application may contact the interactive response system with the user selected option regardless of whether that option is a bottom level option.

In step 360, the mobile application may contact the interactive response system with the user selected option. In one embodiment, the application may contact the interactive response system over the Internet. In another embodiment, the application may contact the interactive response system using a cellular network. In still another embodiment, the application may contact the interactive response system using a POTS.

As discussed above, the mobile application may generate the DTMF signal(s) associated with the selected options and transmit those signals with, if necessary, an appropriate pause to allow the interactive response system to recognize and process each signal. For example, if the corresponding key presses for an option are 1-3-2, the application may first generate and transmit the DTMF signal for "1", pause for a predetermined amount of time, generate and transmit the DTMF signal for "3", pause, and then generate and transmit the DTMF signal for "2".

In another embodiment, the mobile application may generate and transmit any other type of signal for interactive response system as is necessary and/or desired.

In step 370, the interactive response system may take the action associated with the option.

In one embodiment, the user may save the option selected as a shortcut for future use. For example, if a user navigated the interactive response system tree and selected "Pay my bill," the user may save this as a shortcut for future interactions.

In addition, the user may set preferences for use with one or more companies. For example, the user may identify and save shortcuts, favorite interactive response system, display sizes and resolutions, etc. In one embodiment, the user may select an option to have any or all information that may normally be spoken displayed on the mobile device. This may be in addition to, or in place of, being spoken. For example, rather than have a credit card balance spoken by the interactive response system, the user may select an option to have this information displayed on the screen. Similarly, the user may select an option to have interactive response system commands (e.g., enter your account password) displayed in addition to, or in place of, being spoken. Other options may be provided for the user as are necessary and/or desired.

In one embodiment, the user may change mobile devices (e.g., from smartphone to tablet computer, notebook computer, desktop computer, etc.) after the interactive response system session has started. In one embodiment, the user may identify the second device by, for example, email address, SMS address, etc., and the session may then be transferred to that device, or may be replicated on that device. In another embodiment, the second device may be registered with the mobile application, company website, etc. and may be selected by the user. In one embodiment, additional authentication may be required before the session may continue on the second device.

Figure 4:
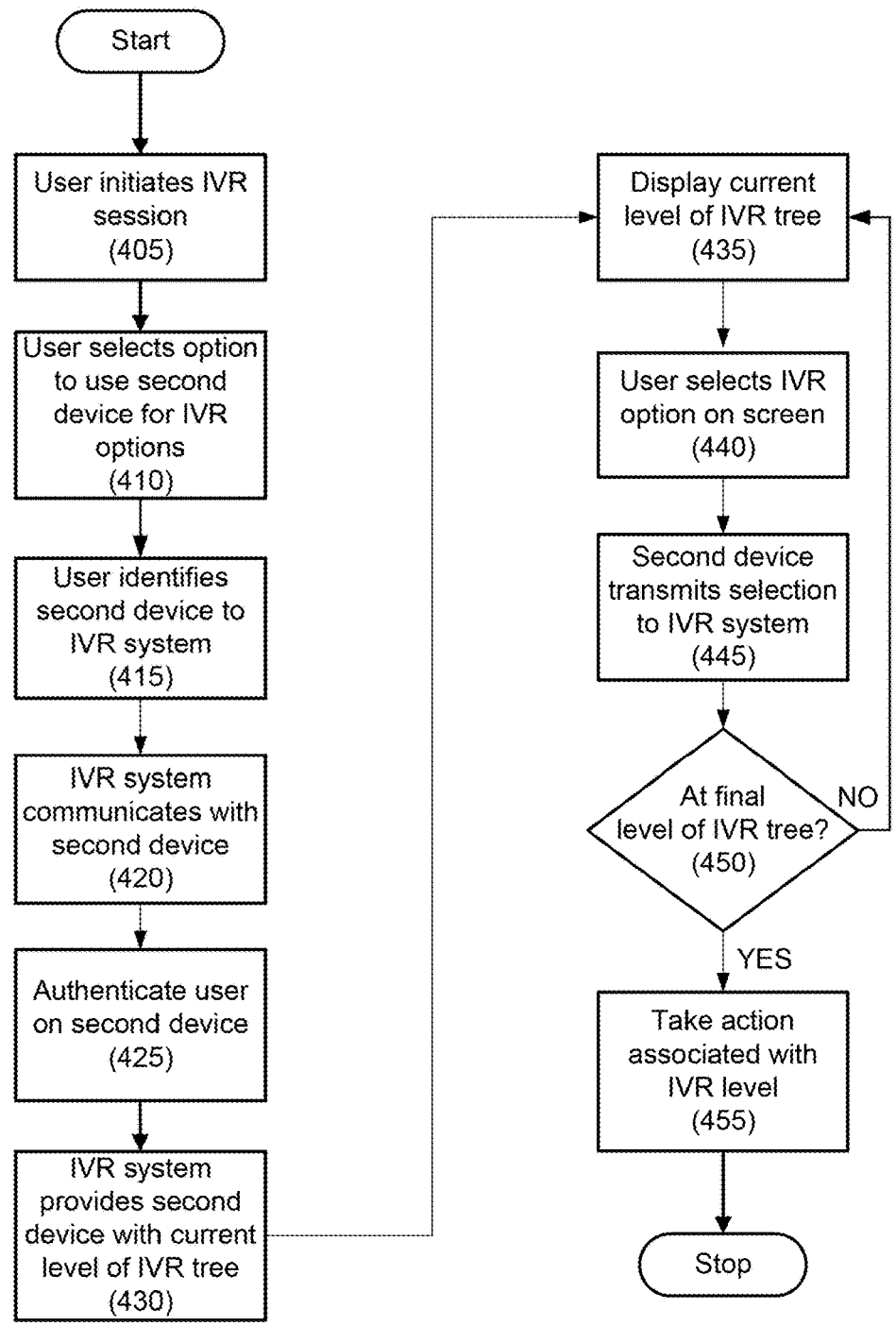
FIG. 4 depicts a method of transferring an interactive response system session to a display-enabled device is according to one embodiment.

In one embodiment, the user may initiate a call with an interactive response system and then have the menus presented on a mobile device. For example, the user may initiate an interactive response system session using a non-smart device (e.g., landline phone or VOIP phone with no display or limited display capabilities), and then may wish to use a device, such as smartphone, tablet computer, notebook computer, desktop computer, etc. to navigate the interactive response system menus. Referring to FIG. 4, a method of transferring an interactive response system session to a display-enabled device is provided.

In step 405, the user may initiate an interactive response system session using a device with limited or no display capabilities.

In step 410, the user may select an option to use a second device, such as a display-enabled device, for interactive response system options. In one embodiment, this may occur at the beginning of an interactive response system session. In another embodiment, this may happen at any time in the interactive response system session.

In step 415, the user may identify the second device to the interactive response system. In one embodiment, the user may identify the second device by, for example, email address, SMS address, etc. In another embodiment, the second device may be a device that is registered to the user, registered to the account, etc.

In step 420, the interactive response system may initiate communications with the second device. In one embodiment, any suitable network may be used for communication, including the Internet, cellular networks, NFC, Bluetooth, etc.

In step 425, the second device may require the user to authenticate him or herself before the interactive response system session can continue. In one embodiment, authentication may be required if sensitive information is being provided to the second device. In another embodiment, authentication may always be required. In still another embodiment, if no data is being provided to the second device other than the interactive response system tree, authentication may not be required.

In one embodiment, the authentication may require the entry of a passcode, such as an account passcode, etc. In another embodiment, the interactive response system may provide the user with a passcode to enter into the second device. In one embodiment, the same level of authentication that was required to access the interactive response system initially may be required to use the second device.

In step 430, interactive response system may provide the second device with the current level of the interactive response system tree.

In step 435, the second device may display the current level of the interactive response system tree.

In step 440, the user may select an option from the interactive response system tree.

In step 445, the second device may communicate the user selection to the interactive response system.

In step 450, if the final level of the tree has not been reached, the next level of the tree is displayed.

If the final level of the tree has been reached, in step 455, the action associated with the selected option may be taken.

In one embodiment, additional data that may be provided by the mobile device may be used in assisting the interactive response system in providing a recommendation to the user. For example, if it is preferable for a task to be performed in person, the interactive response system may use location information from the user's mobile device to identify an available branch location and provide the user with directions to the branch. As another example, if the user requests the location of the nearest facility, such as an ATM, branch, etc., the user's location may be determined, and directions to the nearest facility may be provided.

Figure 5:
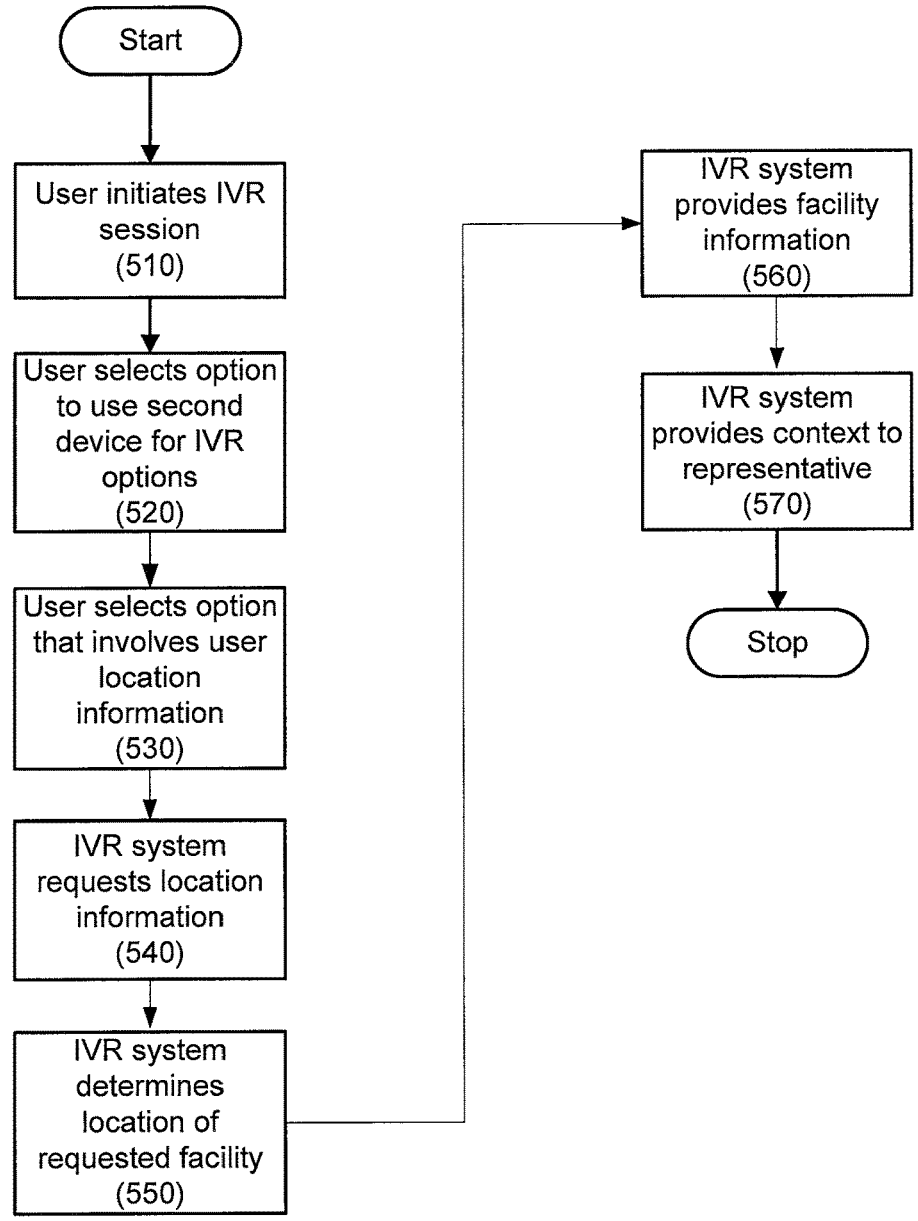
FIG. 5 depicts a method of using data from the user's mobile device according to one embodiment.

Referring to FIG. 5, a method of using data from the user's mobile device is provided. In step 510, the user may initiate an interactive response system session with a device from which the user's location may be determined.

In step 520, the user may select an option for which the user's location information is helpful. For example, the user may request the location of a company facility (e.g., ATM, branch office, etc.). In another embodiment, the interactive response system may identify a request that would be more efficiently handled in person, and may suggest that the user conducts the transaction in person. For example, if a user is trying to access an account statement, and an ATM is close, the user could be informed of the location and asked if he or she wishes to have a copy of the statement printed at the ATM.

In another embodiment, if the battery of the user's mobile device is almost depleted, the user may be provided instructions to the nearest location to complete the interactive response system session in person, with an ATM/kiosk, etc.

In step 530, the interactive response system may request location information from the mobile device. In one embodiment, the user may be required to authorize the use of location data to the interactive response system.

In step 540, the interactive response system may receive the user's location information. In one embodiment, the location information may be based on a GPS location, cellular triangulation, cellular tower location, WiFi network, historical data, manual user entry, etc.

In step 550, the interactive response system may determine the location of the nearest facility.

In step 560, the interactive response system may provide the location and/or directions to the facility to the user. In one embodiment, the interactive response system may send the information to the mobile device by, for example, SMS, email, etc. In another embodiment, the interactive response system may cause a mapping application on the user's mobile device to launch and send directions to that application. In still another embodiment, the interactive response system may provide spoken information to the user. Any or all of the options may be used as necessary and/or desired.

In one embodiment, the user may be provided with turn-by-turn directions from, for example, a mapping application, the interactive response system, etc.

In step 570, the interactive response system may provide the context of the interactive response system session to a representative at the facility as is necessary and/or desired. For example, if the user had a specific question about an account, the representative may be provided with notice that the user is en route, and may be provided with the account information.

In another embodiment, the context may be provided to an ATM or other kiosk so that when the user is authenticated, the requested information can be provided, the session continued, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the ANDROID operating system, the Microsoft WINDOWS™ 8 operating system, Microsoft WINDOWS™ 7 operating system, the Microsoft WINDOWS™ VISTA™ operating system, the Microsoft WINDOWS™ XP™ operating system, the Microsoft WINDOWS™ NT™ operating system, the Windows™ 2000 operating system, the UNIX operating system, the LINUX operating system, the XENIX operating system, the IBM AIX™ operating system, the Hewlett-Packard UX™ operating system, the Novell NETWARE™ operating system, the Sun Microsystems SOLARIS™ operating system, the OS/2™ operating system, the BeOS™ operating system, the MACINTOSH operating system, the APACHE operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

I claim:

1. A method for using an interactive response system with a plurality of devices, comprising:

an interactive response system receiving a communication request from a first electronic device;

the interactive response system establishing an interactive menu session with the first electronic device over a first communication channel;

the interactive response system receiving over the first communication channel from the first electronic device a request for the interactive response system to communicate with an interactive menu application on a second electronic device;

the interactive response system communicating a current level of the interactive menu tree to the interactive menu application on the second electronic device over a second communication channel;

the interactive response system receiving a selection from the interactive menu application from the second electronic device; and the interactive response system providing a synchronization signal to the second electronic device to synchronize the interactive menu application with the current level of the interactive menu tree;

wherein the second electronic device downloads the interactive menu application from a network location.

2. The method of claim 1, wherein the first communication channel comprises a plain old telephone service network.

3. The method of claim 1, wherein the selection from the interactive menu comprises at least one Dual-Tone Multi-Frequency signal.

4. The method of claim 1, wherein the selection from the interactive menu application comprises at least one data packet.

5. The method of claim 1, further comprising:
authenticating the second electronic device.

6. The method of claim 1, wherein the second electronic device is a tablet computer.

7. The method of claim 1, wherein the first communication channel comprises a voice communication channel, and the second communication channel comprises a data communication channel.

8. The method of claim 1, wherein the interactive menu session is active on both the first electronic device and the second electronic device at the same time.

9. The method of claim 1, wherein the first communication channel and the second communication channel are the same communication channel.

10. The method of claim 1, wherein the interactive menu application displays the current level of the interactive menu tree of the interactive menu session on a display of the second electronic device.

11. The method of claim 1, wherein the second electronic device communicates with the interactive response system via the first electronic device.

12. The method of claim 1, wherein the first electronic device and the second electronic device are both associated with the same user.

13. The method of claim 1, further comprising:
the interactive response system transfers the interactive response session from the first electronic device to the second electronic device.

14. The method of claim 1, wherein the first communication further comprises an identifier for the second electronic device, and the interactive response system identifies the second electronic device based on the identifier.

15. The method of claim 1, wherein the interactive response system communicates the interactive menu application by communicating an identification of a software application comprising the interactive menu for the second electronic device to execute.

16. The method of claim 1, wherein the selection of at least one menu option is received as part of the interactive menu session.

* * * * *